(12) United States Patent
Fusayasu et al.

(10) Patent No.: US 7,339,443 B2
(45) Date of Patent: Mar. 4, 2008

(54) COMMON MODE RADIATION INHIBIT CIRCUIT AND ELECTRONIC EQUIPMENT

(75) Inventors: Hirotsugu Fusayasu, Kyoto (JP); Shin-ichi Tanimoto, Kyoto (JP); Seiji Hamada, Osaka (JP); Ryo Matsubara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 282 days.

(21) Appl. No.: 11/294,031

(22) Filed: Dec. 5, 2005

(65) Prior Publication Data

US 2006/0119449 A1 Jun. 8, 2006

(30) Foreign Application Priority Data

Dec. 6, 2004 (JP) ............................. 2004-353203

(51) Int. Cl.
H04B 1/12 (2006.01)
(52) U.S. Cl. ........................................ 333/12; 333/24 R
(58) Field of Classification Search ................ 333/4, 333/5, 12, 22 R, 24 R, 177, 181
See application file for complete search history.

(56) References Cited

U.S. PATENT DOCUMENTS

| | | | |
|---|---|---|---|
| 5,095,291 A * | 3/1992 | Staschover et al. | 333/12 |
| 5,113,159 A * | 5/1992 | Adriaenssens et al. | 333/12 |
| 5,223,806 A | 6/1993 | Curtis et al. | |
| 5,548,254 A * | 8/1996 | Ueno et al. | 333/25 |
| 5,825,259 A * | 10/1998 | Harpham | 333/22 R |
| 6,677,829 B2 * | 1/2004 | Maki et al. | 333/22 R |
| 2006/0049890 A1* | 3/2006 | Wasaki et al. | 333/12 |

FOREIGN PATENT DOCUMENTS

| | | |
|---|---|---|
| JP | 2003-258586 A | 9/2003 |
| JP | 2003-338722 A | 11/2003 |

* cited by examiner

Primary Examiner—Benny Tieu
Assistant Examiner—Eric R Hamill
(74) Attorney, Agent, or Firm—RatnerPrestia

(57) ABSTRACT

To provide a common mode radiation inhibit circuit for a differential transmission line which can inhibit quadratic common mode radiation by ensuring a continuity of grand level at a point of change of a signal grand, including a differential transmission line which is constituted of a pair of signal wiring, and transmits differential signals, signal grounds which are arranged along the differential transmission line, and each have a change point on its way, a transformer, and a reference ground, wherein a primary side of the transformer is connected between an electric midpoint of the pair of signal wiring, and the signal ground at one side of the front and back of the change point of the signal grounds, wherein the secondary side of the transformer is connected between the electric midpoint of the pair of signal wiring and the signal ground at another side of the front and back of the change point, and wherein the reference ground is connected to a point which becomes a neutral sheet of the primary side of the transformer and a point which becomes a neutral sheet of the secondary side of the transformer.

19 Claims, 6 Drawing Sheets

COMMON MODE RADIATION INHIBIT CIRCUIT AND ELECTRONIC EQUIPMENT

BACKGROUND OF THE INVENTION

1. Field of the Invention

The present invention relates to a common mode radiation inhibit circuit for a differential transmission line, and electronic equipment. For example, this relates to a common mode radiation inhibit circuit for the differential transmission line corresponding to a measure against EMC (ElectroMagnetic Compatibility) which prevents occurrence of spurious radiation noise in a differential transmission line which transmits a signal at a high speed with a wiring pattern, a cable, or the like on a printed wiring board.

2. Related Art of the Invention

Heretofore, although a single end signal which performs logic oscillation in a supply voltage has been used for transmission of a high speed signal, the cases where Low Voltage Differential Signaling (LVDS) technology is utilized have increased in number from the viewpoint of spurious radiation noise suppression and tolerance over external noise in response to rise of a drive frequency and expansion of bus width which accompany a request of high speed data transfer in recent years. For example, this is used for communication equipment, a digital interface for a PDP, a liquid crystal panel, or the like.

Generally, in LVDS, a differential driver IC is designed so that only differential mode currents in opposite phases may flow between two transmission lines through which a differential signal flows.

FIG. 5 shows a structural diagram of structure of a conventional LVDS interface.

A differential transmission line is constituted of a pair of signal wiring 55 on a printed wiring board 50 and is constituted of a pair of signal wiring 55 in a cable 52, and a printed wiring board portion and a cable portion are connected through a connector 51. In addition, a signal ground (SG) is constituted of a ground plane 56 on a printed wiring board 50 and is constituted of ground wiring 57 in a cable 52, and a printed wiring board portion and a cable portion are connected through a connector 51.

Two lines of signal wiring 55 which are a plus line and a minus line and whose odd symmetric mode impedance is 50 Ω connect a differential driver IC 53 and a differential receiver IC 54, and the signal wiring 55 is terminated by a 100-Ω terminating resistor 62 in an input terminal of the differential receiver IC 54. Since electrical characteristics of the plus line and minus line of the signal wiring 55 are equal, a balanced transmission line is formed, and one signal is transmitted by these two transmission lines in LVDS.

The differential driver IC 53 drives about 3.5 mA of current, and generates a differential signal which generates a potential difference between the plus line and minus line of the signal wiring 55 on the basis of an input signal from an input terminal. The differential receiver IC 54 receives about 350 mV of differential signal generated at both ends of the 100-Ω terminating resistor 62 arranged at receiving ends between the plus line and minus line of the signal wiring 55, and converts this into a CMOS level to output this from an output terminal.

In the LVDS, since signal currents having the same amplitude but being in reverse directions flow in the plus and minus lines of the signal wiring 55, magnetic fields generated according to the currents flowing in respective sides cancel each other, and further, since a signal level is small, occurrence of spurious radiation noise and crosstalk noise is suppressed. In addition, as to external noise, since logic of the signal is not influenced so long as influences in the plus and minus lines of the signal wiring 55 are relatively the same, this is excellent also in noise resistance.

Nevertheless, in transient timing, since it is difficult besides the LVDS to let currents in two differential transmission lines be in opposite phase states exactly, and further, it is theoretically difficult to make characteristics of rise (tr) and fall (tf) of a signal coincide thoroughly, small common mode currents in the same phase flow between two differential transmission lines in the transient timing. In addition, common mode currents occur by a mismatch between differential transmission lines such as a printed wiring board and a cable, and differential impedances of a termination circuit, and a skew between differential transmission lines, and the like.

In FIG. 5, a differential mode current component is matched and terminated by the terminating resistor 62, and a common mode current component returns through stray capacitance, or the like, which the printed wiring board 50 has. Therefore, the common mode current component generated in the differential signal transmission line was a main cause of spurious radiation noise emitted from a LVDS transmission system.

In order to solve this problem, for example, a noise suppression element and a differential transmission circuit which uses this are known (e.g., refer to patent document 1: Japanese Patent Laid-Open No. 2003-258586).

FIG. 6 shows a structural diagram of an LVDS interface which uses the noise suppression element described in the patent document 1. Here, the same reference numerals are used for the same constituents as those in FIG. 5.

According to this structure shown in FIG. 6, common mode currents which flow in two differential transmission lines are inhibited by the noise suppression element which is constituted of a common mode choke coil 59, and transmission noise and spurious radiation noise can be suppressed.

Nevertheless, in the method of using the noise suppression element of the above-described patent document 1, there was a problem that quadratic common mode radiation which is new spurious radiation noise occurrence phenomenon which was not being considered conventionally could not be inhibited.

In FIG. 6, although ground wiring (SG) 57 of the cable 52 and the ground plane (SG) 56 on the printed wiring board 50 are connected through the connector 51, an area size of a signal ground line changes front and back the connector 51, and hence, an amount of a current which flows through a signal ground changes. The quadratic common mode radiation is radiation noise whose source is a common mode voltage generated by change of such a signal ground, and whose radiation source is the signal ground itself.

A subject on inhibiting the quadratic common mode radiation resulting from change of this signal ground is to achieve securement of continuity of a neutral sheet electric potential in a change point of the signal ground which was not considered conventionally in the differential transmission line.

The present invention is devised to solve the subjects mentioned above, and aims at providing a common mode radiation inhibit circuit for a differential transmission line, and electronic equipment which can inhibit quadratic common mode radiation.

SUMMARY OF THE INVENTION

In order to solve the above problem, the $1^{st}$ aspect of the present invention is a common mode radiation inhibit circuit comprising:

a differential transmission line which is constituted of a pair of signal wiring, and transmits differential signals;

a signal ground of the differential transmission line which is arranged along the differential transmission line, and has a change point on its way;

a transformer; and a reference ground, wherein a primary side of the transformer is connected between an electric midpoint of the pair of signal wiring, and the signal ground at one side of the front and back of the change point of the signal ground;

wherein the secondary side of the transformer is connected between the electric midpoint of the pair of signal wiring and the signal ground at another side of the front and back of the change point of the signal ground; and wherein the reference ground is connected to a point which becomes a neutral sheet of the primary side of the transformer and a point which becomes a neutral sheet of the secondary side of the transformer.

The $2^{nd}$ aspect of the present invention is the common mode radiation inhibit circuit according to the t aspect of the present invention, further comprising:

a first resistive element and a second resistive element which are connected respectively between the pair of signal wiring in respective sides of the front and back of the change point of the signal ground, and have the substantially same resistance as differential impedance of the pair of signal wiring, wherein an electric midpoint of the pair of signal wiring in each side of the front and back of the change point of the signal ground is a point of dividing each resistance of the first resistive element and second resistive element by two.

The $3^{rd}$ aspect of the present invention is the e common mode radiation inhibit circuit according to the $1^{st}$ aspect of the present invention, further comprising:

a first resistive element and a second resistive element which are connected respectively between the pair of signal wiring in respective sides of the front and back of the change point of the signal ground, wherein the first resistive element is formed of two resistive elements which are connected in series and each have substantially one half of resistance of the differential impedance of the pair of signal wiring;

wherein the second resistive element is another two resistive elements which are connected in series and each have substantially one half of resistance of the differential impedance of the pair of signal wiring;

wherein an electric midpoint of the pair of signal wiring in one side of the front and back of the change point of the signal ground is a junction point of both of the two resistive elements; and wherein an electric midpoint of the pair of signal wiring in the other side of the front and back of the change point of the signal ground is a junction point of both of the another two resistive elements.

The $4^{th}$ aspect of the present invention is the common mode radiation inhibit circuit according to the lt aspect of the present invention, wherein the differential transmission line in the primary side of the transformer is formed on a printed wiring board with a portion of the signal ground along the differential transmission line in the primary side;

wherein the differential transmission line in the secondary side of the transformer is formed of a cable with a portion of the signal ground along the differential transmission line in the secondary side; and wherein the change point of the signal ground is a junction point of the printed wiring board and the cable.

The $5^{th}$ aspect of the present invention is the common mode radiation inhibit circuit according to the $4^{th}$ aspect of the present invention, wherein a point which becomes a neutral sheet in the primary side of the transformer is an endpoint in a side of the ground plane to which a ground plane of the printed wiring board is connected; and wherein a point which becomes a neutral sheet in the secondary side of the transformer is a midpoint in the secondary side of the transformer to which signal ground wiring of the cable is connected.

The $6^{th}$ aspect of the present invention is the common mode radiation inhibit circuit according to the $1^{st}$ aspect of the present invention, wherein the reference ground is a frame ground.

The $7^{th}$ aspect of the present invention is the common mode radiation inhibit circuit according to the $1^{st}$ aspect of the present invention, wherein the change point of the signal ground is a point where conductivity of the signal ground in a transmission direction of a signal changes.

The $8^{th}$ aspect of the present invention is the common mode radiation inhibit circuit according to the $2^{nd}$ aspect of the present invention, wherein the change point of the signal ground is a point where conductivity of the signal ground in a transmission direction of a signal changes.

The $9^{th}$ aspect of the present invention is the common mode radiation inhibit circuit according to the $3^{rd}$ aspect of the present invention, wherein the change point of the signal ground is a point where conductivity of the signal ground in a transmission direction of a signal changes.

The $10^{th}$ aspect of the present invention is the common mode radiation inhibit circuit according to the $4^{th}$ aspect of the present invention, wherein the change point of the signal ground is a point where conductivity of the signal ground in a transmission direction of a signal changes.

The $11^{th}$ aspect of the present invention is the common mode radiation inhibit circuit according to the $5^{th}$ aspect of the present invention, wherein the change point of the signal ground is a point where conductivity of the signal ground in a transmission direction of a signal changes.

The $12^{th}$ aspect of the present invention is the common mode radiation inhibit circuit according to the $6^{th}$ aspect of the present invention, wherein the change point of the signal ground is a point where conductivity of the signal ground in a transmission direction of a signal changes.

The $13^{th}$ aspect of the present invention is an electronic equipment, comprising the common mode radiation inhibit circuit according to the $1^{st}$ aspect of the present invention.

The $14^{th}$ aspect of the present invention is an electronic equipment, comprising the common mode radiation inhibit circuit according to the $2^{nd}$ aspect of the present invention.

The $15^{th}$ aspect of the present invention is an electronic equipment, comprising the common mode radiation inhibit circuit according to the $3^{rd}$ aspect of the present invention.

The $16^{th}$ aspect of the present invention is an electronic equipment, comprising the common mode radiation inhibit circuit according to the $4^{th}$ aspect of the present invention.

The $17^{th}$ aspect of the present invention is an electronic equipment, comprising the common mode radiation inhibit circuit according to the $5^{th}$ aspect of the present invention.

The 18th aspect of the present invention is an electronic equipment, comprising the common mode radiation inhibit circuit according to the 6th aspect of the present invention.

The 19th aspect of the present invention is an electronic equipment, comprising the common mode radiation inhibit circuit according to the 7th aspect of the present invention.

In order to solve the subjects mentioned above, the present invention can provide a common mode radiation inhibit circuit for a differential transmission line, and electronic equipment which can inhibit quadratic common mode radiation.

DESCRIPTION OF SYMBOLS

10 Printed Wiring Board
11 Connector
12 Cable
13 Differential Driver IC
14 Differential Receiver IC
15 Signal Wiring
16 Ground Plane (SG)
17 Ground Wiring (SG)
18 FG
20 Common Mode Current
21, 31 Forced Transformers
22 Terminating Resistor
23 First Resistive Element
24 Second Resistive Element
25, 26 Resistive Elements
32 Land-based Digital Television Circuit
33 Front-end Unit (RF Circuit)
34 Back-end Unit
35 Antenna
36 Image Processing Circuit
37 Image Conversion Processing Circuit
38 Differential Driver
39 Differential Receiver
40 Panel Signal Processing Circuit
41 Panel Drive Circuit
42 Display Panel
59 Common Mode Choke Coil

PREFERRED EMBODIMENTS OF THE INVENTION

Hereafter, embodiments of the present invention will be described with referring to drawings.

Embodiment 1

A common mode radiation inhibit circuit for a differential transmission line according to a first embodiment of the present invention will be described on the basis of FIGS. 1 and 2.

Figure 1:
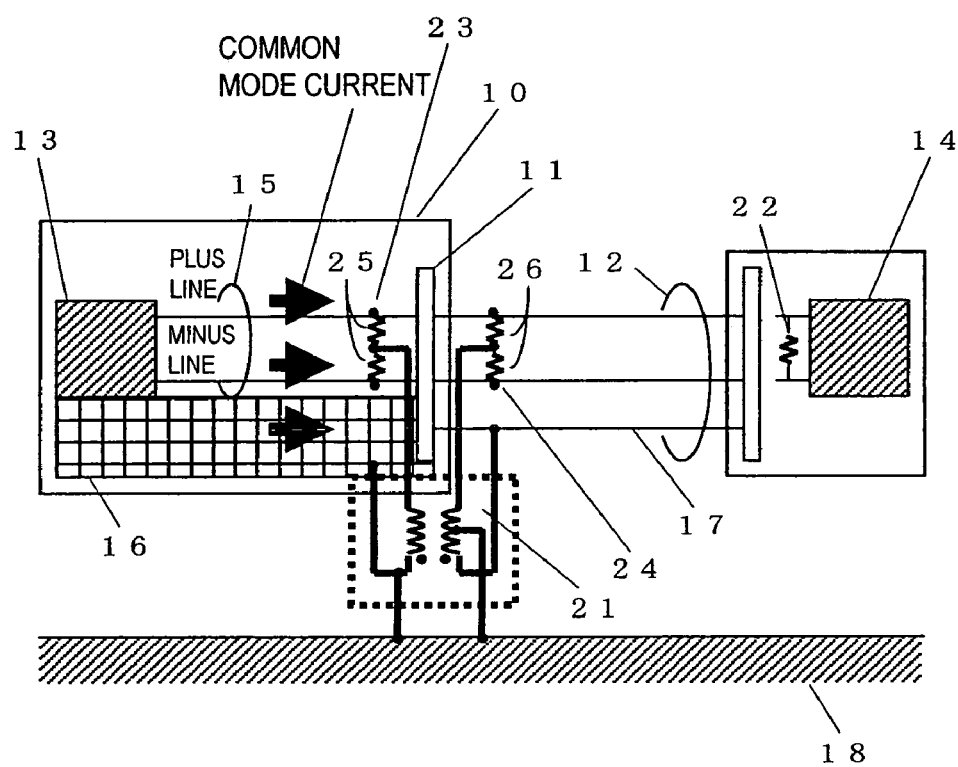
FIG. 1 is a structural diagram of a common mode radiation inhibit circuit for a differential transmission line according to a first embodiment of the present invention.
Figure 2:
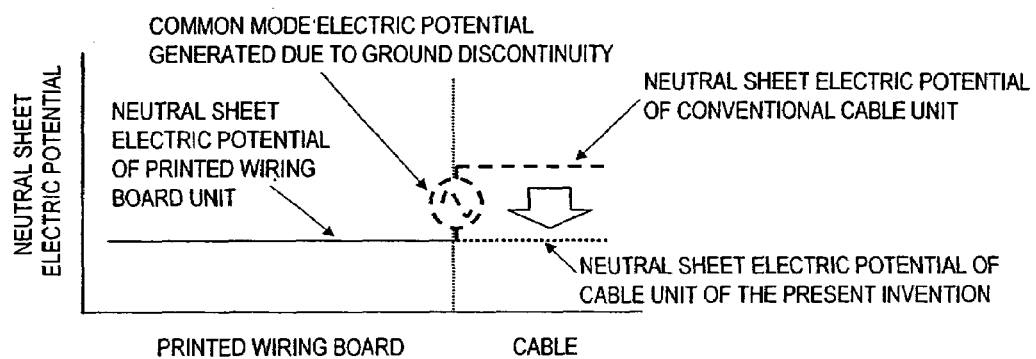
FIG. 2 is a neutral sheet electric potential diagram of a neutral sheet for explaining common mode electric potential.

FIG. 1 is a structural diagram of a common mode radiation inhibit circuit for a differential transmission line according to a first embodiment of the present invention. FIG. 2 is a neutral sheet potential diagram of explaining a common mode electric potential. A "neutral sheet" is a boundary surface between two magnetic fields, which are generated around the plus line and the minus line of a differential transmission line. For example, when the plus line and the minus line of the differential transmission line are parallel cables, the distance from these two cables to the "neutral sheet" is the same, while the "neutral sheet" is close to the ground in the case of a microstrip line.

In FIG. 1, the common mode radiation inhibit circuit for a differential transmission line according to the first embodiment comprises a differential transmission line which is constituted of a pair of signal wiring 15 in a plus line and a minus line which connects a differential driver IC 13 and a differential receiver IC 14, a ground plane (SG) 16 arranged on a printed wiring board 10 which is a signal ground of this differential transmission line, ground wiring (SG) 17 formed in a cable 12, a transformer 21, and a FG (frame ground) 18 which is a reference ground.

The signal ground (SG) is constituted of a ground plane (SG) 16 on the printed wiring board 10, and ground wiring (SG) 17 in the cable 12, and is connected through a connector 11.

Since an area size of the signal ground line changes front and back the connector 11, an amount of a current which flows through the signal ground changes. Thus, electric conductivity of the signal ground in a transmission direction of a signal changes front and back the connector 11, and becomes discontinuous. In addition, the connector 11 is an example of the change point of the signal ground of the present invention.

In addition, the change point of the signal ground is a point where electric conductivity of a signal ground in a transmission direction of a signal changes. And, what are considered as the cases that electric conductivity change are the case that a cross-sectional area size of a signal ground vertical to a transmission direction of a signal changes, the case that materials of a signal ground differ in a transmission direction of a signal, the case that environmental temperature of a signal ground changes in a transmission direction of a signal, and the like.

The pair of signal wiring 15 is constituted of a portion provided in the printed wiring board 10, and a portion formed in the cable 12, and is connected through the connector 11. As described above, the connector 11 becomes a change point of the neutral sheet electric potential of the signal ground. As shown in FIG. 1 the front and back of this change point, that is, between the plus line and minus line of the respective signal wiring 15 of the portion provided in the printed wiring board 10, and the portion formed in the cable 12, a first resistive element 23 and a second resistive element 24 are connected respectively.

The first resistive element 23 is made of two resistive elements 25, which are connected in series and whose resistance are 50 Ω each which is half of 100 Ω of differential impedance of the pair of signal wiring 15. Hence, the first resistive element 23 has the same 100 Ω of resistance as 100 Ω of differential impedance of the pair of signal wiring 15, and this resistance of 100 Ω is divided into halves at a junction point of both the resistive elements 25 connected in series. The junction point of both the resistive elements 25 connected in series becomes an electric midpoint of the pair of signal wiring 15 by performing such constitution.

Similarly, the second resistive element 24 is made of two resistive elements 26, which are connected in series and whose resistance are 50 Ω each which is half of 100 Ω of differential impedance of the pair of signal wiring 15. Hence, the second resistive element 24 has the same 100 Ω of resistance as 100 Ω of differential impedance of the pair of signal wiring 15, and this resistance of 100 Ω is divided into halves at a junction point of both the resistive elements 26 connected in series. The junction point of both the resistive elements 26 connected in series becomes an electric midpoint of the pair of signal wiring 15 by performing such constitution.

In addition, it is defined that differential impedance is a measured value of impedance between a pair of transmission lines.

A primary side of the transformer 21 is connected to the junction point of both the resistive elements 25 which are connected in series, and which forms the first resistive element 23, and the ground plane 16 which is an SG. And, the secondary side of the transformer 21 is connected to the junction point of both the resistive elements 26 which are connected in series, and which forms the second resistive element 24, and the ground wiring 17 which is an SG.

In addition, the signal wiring 15 formed on the printed wiring board 10 is an example of the differential transmission line arranged in front of the change point of the signal ground of the present invention. The signal wiring 15 which forms the cable 12 is an example of the differential transmission line arranged back of the change point of a signal ground of the present invention.

Then, a primary ground point which becomes a neutral sheet in the primary side of the transformer 21, and a secondary ground point which becomes a neutral sheet in the secondary side are connected to the FG (frame ground) 18 which provides the reference of the SG. Here, a neutral sheet means a plane where an electromagnetic field balances between signal wiring and a ground of a transmission line. Furthermore, the FG 18 is an example of the reference ground of the present invention becoming a reference of a signal ground.

For example, a pair of signal wiring 15 which are in a plus line and a minus line, and whose odd symmetric mode impedance is 50 Ω each connect the differential driver IC 13 and differential receiver IC 14, and the pair of signal wiring 15 is terminated by, for example, a 100-Ω terminating resistor 22, which is equal to the differential impedance, in an input terminal of the differential receiver IC 14. Since electrical characteristics of the plus line and minus line of the signal wiring 15 are equal, a balanced transmission line is formed, and one signal is transmitted with a transmission line which is constituted of this pair of signal wiring 15.

The differential driver IC 13 drives about 3.5 mA of current, and generates a differential signal which generates a potential difference between the plus line and minus line of the pair of signal wiring 15 on the basis of an input signal from an input terminal. The differential receiver IC 14 receives about 350 mV of differential signal generated at both ends of the 100-Ω terminating resistor 22 connected at receiving ends between the plus line and minus line of the signal wiring 15, and converts this into a CMOS level to output this from an output terminal.

On the printed wiring board 10 which has the ground plane 16, a microstrip line is formed as an SG, and in the cable 12 which has the ground wiring 17, parallel lines are formed as the SG, and hence, respective neutral sheets differ. Hence, in the case of a conventional circuit which does not have the first resistive element 23, second resistive element 24, and transformer 21, as shown in "neutral sheet electric potential of printed wiring board unit" and "neutral sheet electric potential of conventional cable unit" of FIG. 2, a neutral sheet becomes a discontinuous point at the change point of an SG, and a common mode electric potential occurs.

The neutral sheet electric potential in the microstrip line is close to the ground plane 16, and the neutral sheet electric potential in the parallel lines is a midpoint of a midpoint of the plus line and minus line of the signal wiring 15, and the ground wiring. A primary ground point of the transformer 21 where the ground plane 16 of the printed wiring board 10 is connected to the primary side is made an endpoint in a side of the ground plane 16 of the transformer 21, and the endpoint is connected to the FG 18. In addition, a secondary ground point of the transformer 21 where the ground wiring 17 of the cable 12 is connected to the secondary side is made a midpoint of the secondary side of the transformer 21, and the midpoint is connected to the FG 18.

Here, since the midpoint of the secondary side of the transformer 21 is connected to the FG 18 as shown in FIG. 1, it is possible to make the neutral sheets front and back the connector 11, which is a change point of the signal ground, the same, and hence, it is possible to inhibit the occurrence of a common mode electric potential, and to inhibit quadratic common mode radiation.

Specifically, with letting, for example, numbers of turns of the primary side and secondary side of the transformer 21 be the same, letting a neutral sheet electric potential on the printed wiring board 10 be 0 V, letting a neutral sheet electric potential of the cable 12 be 0.1 V, and letting the FG 18 be 0 V, in the case of the structure in FIG. 1, a neutral sheet electric potential of the midpoint of the signal wiring 15 of the cable 12 becomes 0 V to become the same electric potential as a neutral sheet electric potential of the midpoint of the signal wiring 15 on the printed wiring board 10.

In addition, although the line having 50 Ω of odd symmetric mode impedance and 100 Ω of differential impedance is explained as an example in the common mode radiation inhibit circuit for the differential transmission line according to this first embodiment shown in FIG. 1, impedance is not limited to this.

Furthermore, in order to take out the respective electric midpoints in the plus line and minus line of the pair of signal wiring 15 on the front and back of the change point of the signal ground in the common mode radiation inhibit circuit for the differential transmission line according to this first embodiment, the first resistive element 23 and second resistive element 24 are used, and two 50-Ω resistive elements are connected in series as the first resistive element 23 and second resistive element 24 respectively, but the same effect is shown even if the respective electric midpoints are taken out by other methods.

Moreover, the resistive elements with equal resistance are connected in series as the points which divide respective resistive elements of the first resistive element 23 and second resistive element 24 into halves, and the junction points are used in the common mode radiation inhibit circuit for the differential transmission line of this first embodiment. Nevertheless, so long as they are points where resistances of resistive elements divided into halves become equal, any structure shows the same effect.

In addition, although LVDS is explained as an example in the common mode radiation inhibit circuit for the differential transmission line of this first embodiment, other differential transmission systems show the same effect.

Embodiment 2

A common mode radiation inhibit circuit for a differential transmission line according to a second embodiment of the present invention will be explained on the basis of FIG. 3.

Figure 3:
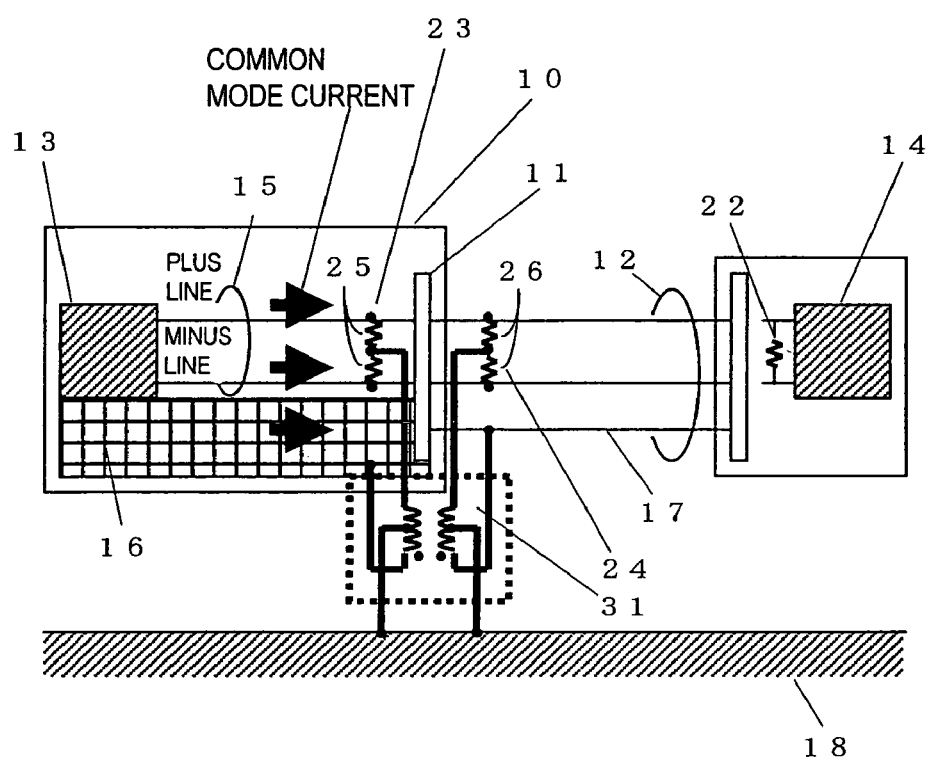
FIG. 3 is a structural diagram of a common mode radiation inhibit circuit for a differential transmission line of a second embodiment of the present invention.

FIG. 3 is a structural diagram of a common mode radiation inhibit circuit for a differential transmission line according to a second embodiment of the present invention. Furthermore, the same reference numerals are used for the same constituents as those in FIG. 1.

The common mode radiation inhibit circuit for a differential transmission line according to the second embodiment differs in a position of a primary ground point in a primary side of a transformer 31 connected to the ground plane 16 of the printed wiring board 10 from the common mode radiation inhibit circuit according to the first embodiment. At the first embodiment, as shown in FIG. 1, the FG 18 which is the primary ground point is connected to the endpoint which connected to the ground plan 16, but it is connected to a middle point between both endpoints in the primary side of the transformer 31 in this second embodiment.

Since the neutral sheet differs according to a shape and arrangement of the ground plane 16. When the primary ground point of the transformer 31 is made a middle point in the primary side of the transformer 31 and the middle point position is adjusted so as to make the neutral sheets front and back of the change point of the signal ground the same, it is possible to inhibit the occurrence of a common mode electric potential, and to inhibit quadratic common mode radiation.

In addition, although the position where the secondary ground point of the secondary side of the transformer 31 is connected is made the midpoint of the secondary side of the transformer 31 in the common mode radiation inhibit circuit for the differential transmission line according to this second embodiment show in FIG. 3, it is also sufficient to make it a middle point of the secondary side which is not the midpoint. The position where the primary ground point and secondary ground point which are connected to the primary side and secondary side of the transformer 31 may be a position where neutral sheets on the front and back of the change point of the signal ground can be made the same.

Embodiment 3

Figure 4:
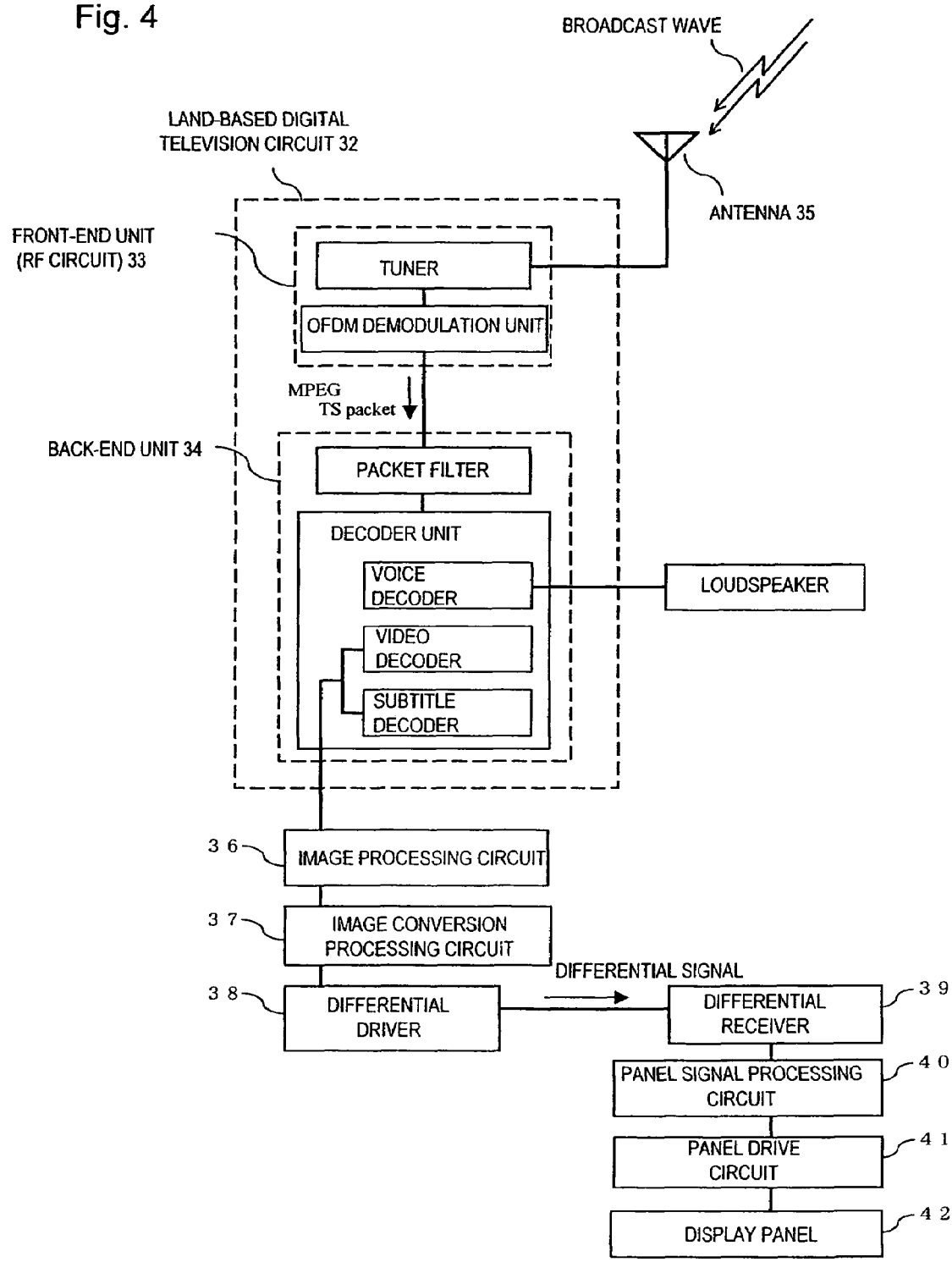
FIG. 4 is a block diagram of a PDP TV set of a third embodiment of the present invention corresponding to land-based digital broadcasting.
Figure 5:
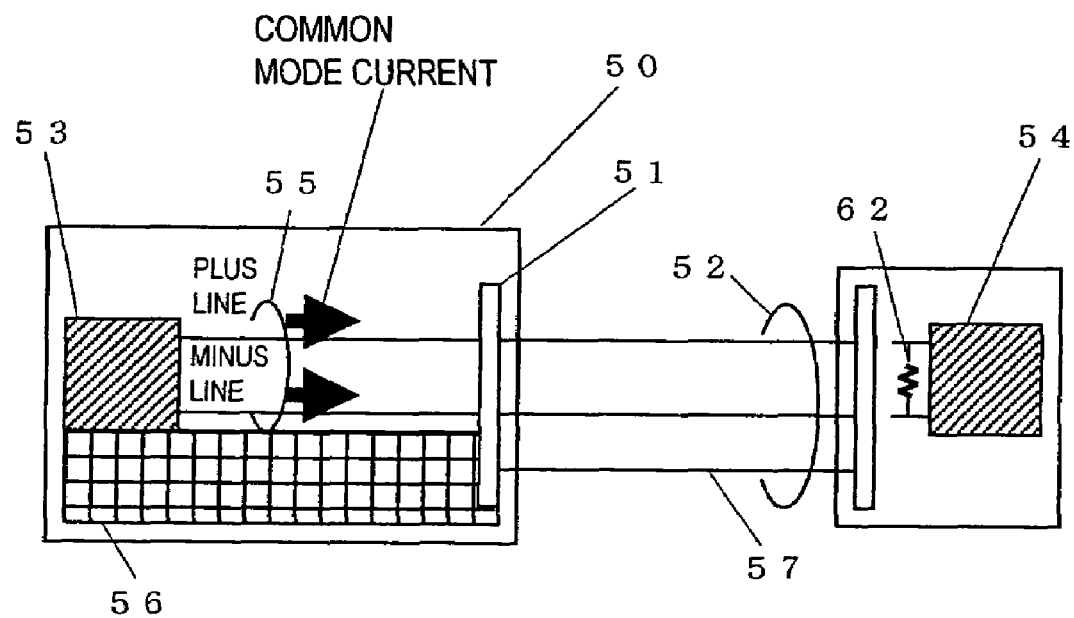
FIG. 5 is a structural diagram of explaining a conventional LVDS interface.
Figure 6:
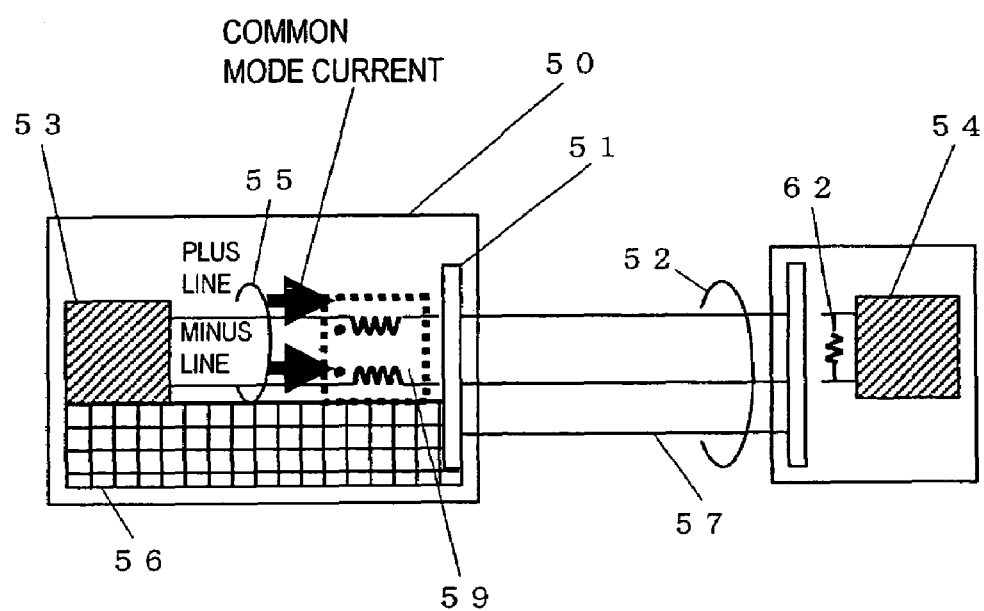
FIG. 6 is a structural diagram of an LVDS interface using a noise suppression element for a conventional measure against a common mode.

FIG. 4 is a block diagram of a PDP TV set of a third embodiment of the present invention corresponding to land-based digital broadcasting. The PDP TV set of this third embodiment corresponds to an example of the electronic equipment equipped with the inhibit circuit of common mode radiation according to the present invention.

The PDP TV set of this third embodiment is equipped with a land-based digital television circuit 32 which is constituted of a front-end unit (RF circuit) 33 and a back-end unit 34. In addition, it is further equipped with an image processing circuit 36 which processes an image and title data which are decoded in the land-based digital television circuit 32, and an image conversion processing circuit 37 which converts into display data the image and title data which are processed in the image processing circuit 36. Furthermore, it is still further equipped with a panel signal processing circuit 40 which converts the display data into gradation data of displaying on the display panel 42, a panel drive circuit 41 which supplies a voltage corresponding to the gradation data to the display panel 42 to make an image displayed on the display panel 42.

Moreover, it is further equipped with a differential driver 38 and a differential receiver 39 of transferring the display data generated in the image conversion processing circuit 37 to the panel signal processing circuit 40. The inhibit circuit of common mode radiation according to the present invention as shown in the first or second embodiment is provided in a display data transmitting portion of the differential driver 38.

Next, the operation of the PDP TV set of this third embodiment will be explained using FIG. 4.

A tuner of the front-end unit 33 receives a digital broadcast wave through an antenna 35. The front-end unit 33 demodulates broadcast data received by the tuner in an OFDM demodulation unit, and transfers it to the back-end unit 34 in a transport packet.

A packet filter of the back-end unit 34 builds each data of the transport packet received from the front-end unit 33, and decodes it by a decoder unit. Speech data decoded by the decoder unit is outputted to a speaker, and the image and title data are transferred to the image processing circuit 36.

After the processing of correction and the like is performed by the image processing circuit 36, the data is converted into the display data in the image conversion processing circuit 37. The data converted in the image conversion processing circuit 37 is differentially transmitted by the differential driver 38 to the differential receiver 39.

The display data received in the differential receiver 39 is converted into gradation data by the panel signal processing circuit 40, and is displayed on the display panel 42 by the panel drive circuit 41.

In the PDP TV set of this third embodiment, although high-speed transmission of the display data is performed between the differential driver 38 and differential receiver 39, since the inhibit circuit of common mode radiation according to the present invention is provided, spurious radiation noise sent out to the outside is suppressed.

In addition, in this third embodiment, although the PDP TV set is explained as an example, also other electronic equipment can suppress spurious radiation noise by using the inhibit circuit of common mode radiation according to the present invention in a portion where high-speed data is transmitted by differential transmission.

It is possible to achieve electronic equipment with few spurious radiation noise by making electronic equipment, such as a liquid crystal TV set, a projector, a DVD recorder, and a PC, which have each differential transmission route, provide the common mode radiation inhibit circuit for the differential transmission line which has the structure of the present invention.

A subject on inhibiting the quadratic common mode radiation resulting from change of this signal ground is to achieve securement of continuity of a neutral sheet electric potential in a change point of the signal ground which was not considered conventionally in the differential transmission line. In the common mode radiation inhibit circuit for the differential transmission line according to the present invention, adjusting of a neutral sheet electric potential of a primary side and a secondary side of a transformer achieves securement of continuity of this neutral sheet electric potential.

As explained above, by using the common mode radiation inhibit circuit for the differential transmission line which has the structure of the present invention, it becomes possible to achieve the securement of continuity of a neutral sheet electric potential in a change point of a signal ground, and to inhibit quadratic common mode radiation.

The common mode radiation inhibit circuit for the differential transmission line according to the present invention can suppress quadratic common mode radiation by securing the continuity of a neutral sheet electric potential by a transformer at a change point of a signal ground of a differential transmission line. Hence, this is useful as a common mode radiation inhibit circuit for the differential transmission line corresponding to a measure against EMC which prevents occurrence of spurious radiation noise of a printed wiring board and a cable. In addition, this is useful in electronic equipment which has a differential transmission route.

What is claimed is:

1. A common mode radiation inhibit circuit comprising:
    a differential transmission line which is constituted of a pair of signal wiring, and transmits differential signals;
    a signal ground of the differential transmission line which is arranged along the differential transmission line, and has a change point on its way;
    a transformer; and
    a reference ground, wherein a primary side of the transformer is connected between an electric midpoint of the pair of signal wiring, and the signal ground at one side of the front and back of the change point of the signal ground;
    wherein the secondary side of the transformer is connected between the electric midpoint of the pair of signal wiring and the signal ground at another side of the front and back of the change point of the signal ground; and
    wherein the reference ground is connected to a point which becomes a neutral sheet of the primary side of the transformer and a point which becomes a neutral sheet of the secondary side of the transformer.

2. The common mode radiation inhibit circuit according to claim 1, further comprising:
    a first resistive element and a second resistive element which are connected respectively between the pair of signal wiring in respective sides of the front and back of the change point of the signal ground, and have the substantially same resistance as differential impedance of the pair of signal wiring, wherein an electric midpoint of the pair of signal wiring in each side of the front and back of the change point of the signal ground is a point of dividing each resistance of the first resistive element and second resistive element by two.

3. The common mode radiation inhibit circuit according to claim 2, wherein the change point of the signal ground is a point where conductivity of the signal ground in a transmission direction of a signal changes.

4. An electronic equipment, comprising the common mode radiation inhibit circuit according to claim 2.

5. The common mode radiation inhibit circuit according to claim 1, further comprising:
    a first resistive element and a second resistive element which are connected respectively between the pair of signal wiring in respective sides of the front and back of the change point of the signal ground, wherein the first resistive element is formed of two resistive elements which are connected in series and each have substantially one half of resistance of the differential impedance of the pair of signal wiring;
    wherein the second resistive element is another two resistive elements which are connected in series and each have substantially one half of resistance of the differential impedance of the pair of signal wiring;
    wherein an electric midpoint of the pair of signal wiring in one side of the front and back of the change point of the signal ground is a junction point of both of the two resistive elements; and
    wherein an electric midpoint of the pair of signal wiring in the other side of the front and back of the change point of the signal ground is a junction point of both of the another two resistive elements.

6. The common mode radiation inhibit circuit according to claim 5, wherein the change point of the signal ground is a point where conductivity of the signal ground in a transmission direction of a signal changes.

7. An electronic equipment, comprising the common mode radiation inhibit circuit according to claim 5.

8. The common mode radiation inhibit circuit according to claim 1, wherein the differential transmission line in the primary side of the transformer is formed on a printed wiring board with a portion of the signal ground along the differential transmission line in the primary side;
    wherein the differential transmission line in the secondary side of the transformer is formed of a cable with a portion of the signal ground along the differential transmission line in the secondary side; and
    wherein the change point of the signal ground is a junction point of the printed wiring board and the cable.

9. The common mode radiation inhibit circuit according to claim 8, wherein a point which becomes a neutral sheet in the primary side of the transformer is an endpoint in a side of the ground plane to which a ground plane of the printed wiring board is connected; and
    wherein a point which becomes a neutral sheet in the secondary side of the transformer is a midpoint in the secondary side of the transformer to which signal ground wiring of the cable is connected.

10. The common mode radiation inhibit circuit according to claim 9, wherein the change point of the signal ground is a point where conductivity of the signal ground in a transmission direction of a signal changes.

11. An electronic equipment, comprising the common mode radiation inhibit circuit according to claim 9.

12. The common mode radiation inhibit circuit according to claim 8, wherein the change point of the signal ground is a point where conductivity of the signal ground in a transmission direction of a signal changes.

13. An electronic equipment, comprising the common mode radiation inhibit circuit according to claim 8.

14. The common mode radiation inhibit circuit according to claim 1, wherein the reference ground is a frame ground.

15. The common mode radiation inhibit circuit according to claim 14, wherein the change point of the signal ground is a point where conductivity of the signal ground in a transmission direction of a signal changes.

16. An electronic equipment, comprising the common mode radiation inhibit circuit according to claim 14.

17. The common mode radiation inhibit circuit according to claim 1, wherein the change point of the signal ground is a point where conductivity of the signal ground in a transmission direction of a signal changes.

18. An electronic equipment, comprising the common mode radiation inhibit circuit according to claim 17.

19. An electronic equipment, comprising the common mode radiation inhibit circuit according to claim 1.

* * * * *